July 21, 1970  P. J. KLEMKOWSKI, JR  3,521,395
SQUID-PRIMER
Filed June 7, 1968
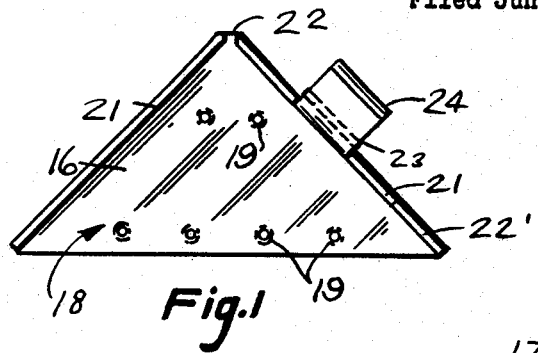
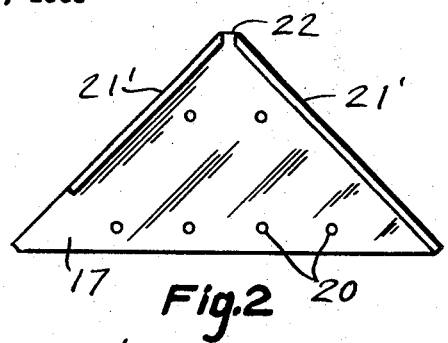
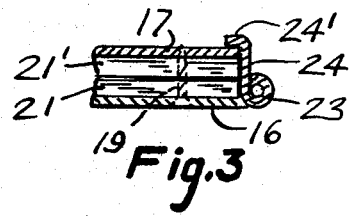
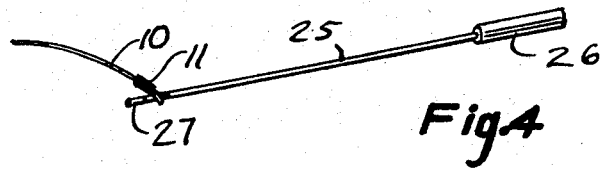
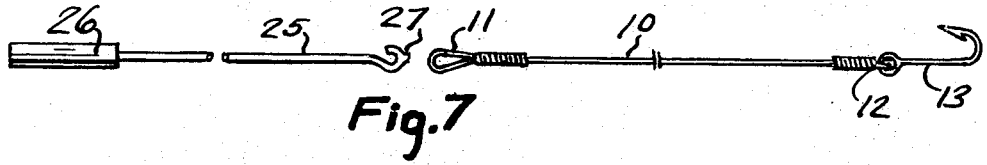
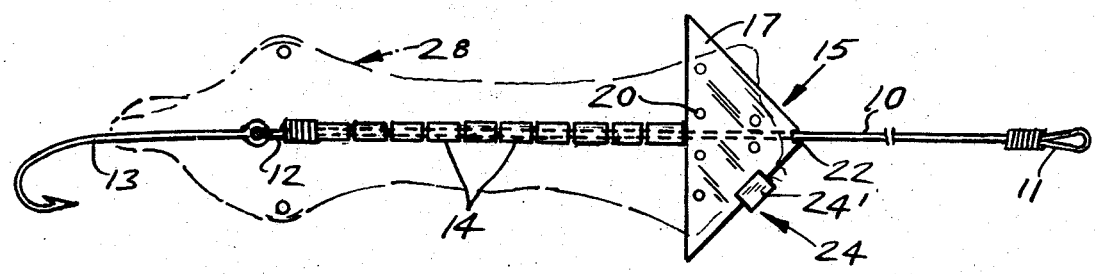
INVENTOR.
*Philip Klemkowski, Jr.*

United States Patent Office 3,521,395
Patented July 21, 1970

3,521,395
SQUID-PRIMER
Philip J. Klemkowski, Jr., 1146 Hull St.,
Baltimore, Md. 21230
Filed June 7, 1968, Ser. No. 740,426
Int. Cl. A01k 83/06
U.S. Cl. 43—44.6                                    3 Claims

ABSTRACT OF THE DISCLOSURE

A triangular shaped clamp attachable to a squid and slidably carried on a stainless steel leader having a loop connection at one end and a fishhook at its other end; a plurality of short tubular sleeves interposed on the leader between the hook and the said clamp and, associated with the clamp a leader and sleeve primer rod having a squid strung thereon, as the means for sliding the squid from the rod onto the said leader.

The present invention relates to lures in deep-sea fishing, more particularly when trolling, and has for its main objective the provision of means for attaching the common squid (cephaloped) to hooks, a fresh squid being reputed to be the best bait in ocean fishing and the most durable.

Another and important object of the invention is the provision of a squid primer or mount comprising a clamp to which a squid is easily and quickly attached and which may be used repeatedly time after time as the bait is changed.

Another object of the invention is the provision of a clamp of the character and for the purpose described which eliminates the necessity of sewing and then hand wrapping over and over a tying thread as the means of attaching a squid to the leader. This method, which is the one presently used, is time consuming, ineffective and destructive to the cephaloped.

Other and important objects of the instant invention are the provision of a practical and inexpensive squid-primer which allows the squid to withstand pressure of the waves, keep its size and life appearance for a considerable length of time, all day if necessary, and allow the fisherman to keep the expensive squids in frozen state and their fresh quality longer.

Still further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

In the drawings;

FIGS. 1 and 2 are inner face views of the base and lid members, respectively, of the squid clamp.

FIG. 3 is a vertical sectional detail through the clamp.

FIG. 4 is a perspective view of the primer rod used in association with the invention in sliding a squid strung thereon onto the wire leader.

FIG. 5 is a sub assembly of the leader, hook and sleeves on the leader.

FIG. 6 shows a squid properly strung along the length of the rod of FIG. 4.

FIG. 7 is a side view of the primer rod and leader in end-to-end relation with a fragmentary portion of each member broken away.

And, FIG. 8 shows the invention in longitudinal assembly with a squid clamped to the leader and ready to go, the squid being shown in phantom outline.

In the drawings which are for the purpose of illustration only like numerals refer to similar parts throughout the several views.

Numeral 10 represents a leader made, preferably, of stainless steel wire with a loop 11 at its forward end for connection to a line, not shown, and loop connection 12 at its other end with a fishhook 13. Strung along the leader 10 in advance of the hook 13 are a plurality of short tubular sleeves 14.

The squid-primer proper, indicated in general by numeral 15, FIG. 8, is a clamp of triangular shape formed of two rigid plates 16 and 17 to be superimposed one upon the other and shown in detail in FIGS. 1 and 2, the plate 16 comprising the bottom member of the clamp and the plate 17 a detachable lid.

Extending upwardly through a row 18 of holes adjacent the base line of the bottom member 16, and a pair of like holes close to its apex, are short spikes 19 which register with and extend into holes 20 in the lid 17 when the clamp is closed. Flanges 21 along the inclined edges of the member 16 and opposing flanges 21' on the lid 17 form the sides of the clamp 15 and are slightly spaced at their point of juncture to provide a leader opening 22.

Having hinge connection 23 with one of the side edges of the bottom member 16 is a releasable clamping lock 24, the outer edge 24' of which is turned laterally to engage over the lid 17 to hold it down against the spikes 19. The lower end portion of one of the flanges 21' is cut away to receive an opposing portion 22' on the corresponding flange 21 of member 16 as an assist in maintaining the members 16 and 17 in proper spaced relation.

For baiting the device a primer rod 25 having a handle 26 at one end and an open eye 27 at the other end for releasably engaging the loop 11 of sleeve-loaded leader 10 is provided. A squid 28, see FIG. 6, is strung along the rod 25 and the eye 27 on the rod hooked into the leader loop 11. This squid 28 is then slid off the rod 25 onto the leader 10, as in FIG. 8, and the rod disengaged from the loop 11. The tail part, which is the leading end of the squid as it is pulled through the water, is placed between the primer members 16 and 17, impaled on the spikes 19 and the clamp 15 closed, the apex of the clamp pointing in the direction which the leader 10 is pulled.

The slightly separated sleeves 14 provide a spacer between the base of the clamp 15 and hook 13 of desired flexibility and yet rigid enough to retain the bait in its original shape and offer resistance to prevent its movement closer to the hook as it is trolled through the water against the pressure of the ocean waves.

Replacement of the bait is accomplished by opening the clamp 15 and placing a fresh squid on the leader 10 in the same manner as above described.

What I claim is:

1. A fishing lure employing a squid as the primer bait and comprising a stainless steel leader having a loop on one end and a hook at its other end, a triangular shaped clamp slidably supported on said leader with its apex pointed in the direction of said loop and, a plurality of tubular sleeves interposed on said leader between said clamp and the said hook, said clamp comprising two plate members superimposed one upon the other and releasable means for holding the clamp closed, the squid being strung along the sleeve carrying portion of said leader with its leading end gripped between the said plates.

2. The combination according to claim 1 and which includes a primer rod formed with a handle at one end and an open eye at its other end for releasably engaging the said loop on the leader, said loop and eye connection permitting a squid strung on the said rod being slid therefrom onto the leader and the rod then disengaged therefrom.

3. In a squid-primer, the combination of two plates superimposed in spaced relation one upon the other, one of said plates comprising the bottom member and the other the removable lid of a clamp attachable to one end of a squid, a plurality of spikes projecting from said bottom plate and on which said squid is impaled, the said lid having openings in registry with and for receiving the pointed ends of said spikes, and releasable locking means for holding the two said plates together, the said two plates comprising said clamp being of triangular shape, said spikes being skewering spikes extending upwardly through said bottom plate member, certain of the said spikes being arranged in a row adjacent and parallel to the base line of the said bottom plate member of said clamp, said clamp forming members including opposing, laterally turned flanges along their inclined side edges, said flanges at the apex of the clamp being slightly spaced to form an entrance aperture for a fish hook leader, said locking means comprising a plate having hinge connection with a side edge of said bottom plate member and a lateral portion engaging over the outer face of the said lid.

References Cited

UNITED STATES PATENTS

| | | | |
|---|---|---|---|
| 2,584,231 | 2/1952 | Schmidt | 43—4 |
| 2,632,276 | 3/1953 | Hale | 43—44.6 X |
| 2,780,022 | 2/1957 | Arntzen | 43—44.6 X |
| 2,948,979 | 8/1960 | Kulp | 43—4 |

FOREIGN PATENTS 8,409  1908  Great Britain.

SAMUEL KOREN, Primary Examiner

D. J. LEACH, Assistant Examiner

U.S. Cl. X.R.

43—4, 44.4